(12) United States Patent
Shi

(10) Patent No.: US 8,812,691 B2
(45) Date of Patent: Aug. 19, 2014

(54) METHOD FOR BINDING AN ADDRESS OF A USER TERMINAL IN AN ACCESS EQUIPMENT

(75) Inventor: Rujun Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 892 days.

(21) Appl. No.: 12/192,972

(22) Filed: Aug. 15, 2008

(65) Prior Publication Data

US 2008/0301269 A1    Dec. 4, 2008

Related U.S. Application Data

(63) Continuation of application No. PCT/CN2006/002991, filed on Nov. 8, 2006.

(30) Foreign Application Priority Data

Feb. 17, 2006    (CN) .......................... 2006 1 0033747

(51) Int. Cl.
*G06F 15/16*    (2006.01)

(52) U.S. Cl.
USPC ........................... 709/228; 709/220; 709/222

(58) Field of Classification Search
USPC .................................. 709/220–222, 226–228
See application file for complete search history.

(56) References Cited

U.S. PATENT DOCUMENTS

| | | | |
|---|---|---|---|
| 6,952,428 B1 * | 10/2005 | Necka et al. ................... | 370/466 |
| 7,024,484 B2 * | 4/2006 | Alexis ........................... | 709/229 |
| 7,072,337 B1 * | 7/2006 | Arutyunov et al. ............ | 370/389 |
| 7,139,818 B1 * | 11/2006 | Kinnear et al. ................ | 709/222 |
| 7,234,163 B1 * | 6/2007 | Rayes et al. ..................... | 726/22 |

(Continued)

FOREIGN PATENT DOCUMENTS

| | | |
|---|---|---|
| CN | 1416239 A | 7/2003 |
| CN | 1567887 A | 1/2005 |
| CN | 1571382 A | 1/2005 |
| CN | 1713629 A | 12/2005 |
| JP | 2000-316016 A | 11/2000 |
| WO | WO 98/26530 A1 | 6/1998 |

OTHER PUBLICATIONS $1^{St}$ Office Action in corresponding Chinese Application No. 200610033747.2 (Oct. 24, 2008).

(Continued)

*Primary Examiner* — Mohamed Ibrahim
(74) *Attorney, Agent, or Firm* — Leydig, Voit & Mayer, Ltd.

(57) ABSTRACT

A method for binding an address of a user terminal in an access equipment includes the following steps. The user terminal requests a dynamic host configuration protocol (DHCP) server via the access equipment to assign an IP address, and the access equipment receives a response message from the DHCP server during the process in which the DHCP server assigns the IP address to the user terminal. The access equipment binds the address of the user terminal with a corresponding port of the access equipment according to the address information and the port information in the response message. By using the scheme of the invention, the access equipment may use the access information and the corresponding port information, which is obtained when the user terminal requests to assign the IP address for implementing binding the address of the user terminal and managing the user terminal effectively and expediently. In addition, since the binding relationship of the user terminal is created dynamically, it could be avoided effectively if the IP address is stolen.

15 Claims, 3 Drawing Sheets

```
┌──────────────────────────────────────────────┐
│  The user terminal requests the DHCP server to │  101
│  assign the IP address. The access equipment   │ ╱
│  receives the response message carrying the    │
│  address information and the port information when │
│          the IP address is assigned.           │
└──────────────────────────────────────────────┘
                        │
                        ▼
┌──────────────────────────────────────────────┐
│  The access equipment binds the address of a user │  102
│  terminal with the corresponding port of the access │ ╱
│                   equipment.                    │
└──────────────────────────────────────────────┘
```

(56) References Cited

U.S. PATENT DOCUMENTS

| | | | |
|---|---|---|---|
| 7,337,224 B1* | 2/2008 | Van Horne et al. | 709/225 |
| 2002/0138614 A1* | 9/2002 | Hall | 709/225 |
| 2004/0005886 A1* | 1/2004 | Oda et al. | 455/422.1 |
| 2005/0044265 A1 | 2/2005 | Vinel et al. | |
| 2005/0074015 A1* | 4/2005 | Chari et al. | 370/400 |
| 2007/0121617 A1* | 5/2007 | Kanekar et al. | 370/389 |

OTHER PUBLICATIONS $2^{nd}$ Office Action in corresponding Chinese Application No. 200610033747.2 (Apr. 24, 2009).

$1^{st}$ Office Action in corresponding European Application No. 06817801.1 (Apr. 2, 2009).

Written Opinion of the International Searching Authority in corresponding PCT Application No. PCT/CN2006/002991 (Mar. 8, 2007).

* cited by examiner

METHOD FOR BINDING AN ADDRESS OF A USER TERMINAL IN AN ACCESS EQUIPMENT

CROSS-REFERENCE TO RELATED APPLICATIONS

This application is a continuation of International Patent Application No. PCT/CN2006/002991, filed Nov. 8, 2006, which claims priority to Chinese Patent Application No. 200610033747.2, filed Feb. 17, 2006, each of which is hereby incorporated by reference in its entirety.

FIELD OF THE INVENTION

The present invention relates to a network technique, and more particularly, to a method for binding an address of a user terminal in an access equipment.

BACKGROUND

Dynamic host configuration protocol (DHCP) is a protocol commonly used for controlling the network accessing manner. This protocol is mature, easy to use, and can be supported by most of the computer operating systems. Based on the DHCP protocol, a user terminal may get access to the network after dynamically acquiring an address from an address pool on a DHCP server, and thus the additional dialer configuration and installation are not required, which brings convenience to network administrators and common users.

However, some users, such as leased line users, may expect to use an unchanged address for a period of time, e.g., the user wants to provide diversified services to the public. In this situation, the operator is expected to assign a fixed address to the user, and the user keeps the fixed IP address for an extended period of time by setting a static IP address.

In the prior art, a static IP address binding function is provided for ensuring the access of the leased line users to the network, i.e., the user port and an assigned fixed IP address are bound in the access equipment; after that, the access equipment merely allows messages from the IP address bound with the user port to pass. The access equipment may be an entity, such as a digital subscriber line access multiplexer (DSLAM).

In the prior art, all the binding relations may need corresponding static configurations in the access equipment and is realized manually by the network administrators. Therefore, if the number of the users is quite large, the burden of the network administrator is inevitably increased and the management of the users becomes complicated. Moreover, since the binding relationship always exists in the access equipment, if an invalid user directly uses the bound static IP address to get access to the network, the access equipment cannot determine whether the user is invalid or valid, which may cause the IP address of the valid user to be stolen.

SUMMARY

The present invention is directed to a method for binding an address of a user terminal in an access equipment, which enables the access equipment to bind the address of the user terminal with the corresponding port in the absence of manual intervention.

Accordingly, the present invention provides the following technical solution.

A method for binding an address of a user terminal in an access equipment includes the following.

A. The access equipment receives a response message from a Dynamic host configuration protocol (DHCP) server during a process which the DHCP server assigns an IP address to a user terminal;

B. The access equipment binds the address of the user terminal with a corresponding port on the access equipment, according to address information and port information carried in the response message.

In the above solution, a dynamic binding table is set and the manner of binding in Step B includes: the access equipment records a binding relationship between the address information of the user terminal and the port information in the dynamic binding table.

After Step B, the above solution further includes: the access equipment inquiries the dynamic binding table according to the address information of the user terminal in the IP message and the port information of the port where the IP message is captured when the access equipment captures the IP message carrying the address information of the user terminal. If the address information of the user terminal corresponding to the port information exists, the captured IP message is forwarded. Otherwise, no process is performed.

After Step B, the above solution further includes: the access equipment deletes the binding relationship of the user terminal from the dynamic binding table when the access equipment captures a DHCP release message carrying the address information of the user terminal.

After Step B, the above solution further includes: an online detection timer is set for the user terminal; when the online detection timer reaches a timeout value, the access equipment transmits an address resolution protocol (ARP) request message to the user terminal and determines whether the returned ARP response message is received. If the returned ARP response message is received, the online detection timer is refreshed; otherwise, the binding relationship of the user terminal is deleted from the dynamic binding table.

The above solution includes: a lease timer is set for the user terminal in the access equipment, and after Step B, the method further includes: when the user terminal transmits a unicast lease renewal request message to the DHCP server, the access equipment determines whether the returned unicast lease renewal response message is received. If the returned unicast lease renewal response message is received, the lease timer is refreshed according to the unicast lease renewal response message; otherwise, when the lease timer reaches the timeout value, the binding relationship corresponding to the user terminal and the lease timer is deleted.

In the above solution, the address information of the user terminal in the response message in Step A is an IP address assigned to the user terminal by the DHCP server and/or an MAC address of the user terminal. The MAC address of the user terminal is obtained by the DHCP server during the process which assigns the IP address to the user terminal.

In the above solution, the process which enables the DHCP server to assign the IP address to the user terminal includes the following.

The user terminal transmits a DHCP protocol message to the access equipment; the access equipment performs an information process on the received DHCP protocol message; and forwards the processed DHCP protocol message to the DHCP server. The processed DHCP protocol message carries the MAC address of the user terminal, and a Remote ID sub-option RID and/or a channel ID sub-option CID, including the port information.

The DHCP server inquires a configuration database stored in the DHCP server according to the RID and/or the CID, determines the IP address assigned to the user terminal, and then returns the DHCP protocol response message to the user terminal via the access equipment. The DHCP protocol response message carries the MAC address of the user terminal, the RID and/or the CID and the IP address assigned to the user terminal.

In the above solution, the manner in which the access equipment performs the information process on the received DHCP protocol message includes: the access equipment records the port information of the port where the DHCP protocol message is captured, generates a RID and/or a CID according to the port information, and then adds the RID and/or the CID into the received DHCP protocol message.

In the above solution, the port information is port description information and/or port position information.

Based on the above, in the method for binding an address of a user terminal in an access equipment according to the present invention, during the process in which the DHCP server assigns the IP address to the user terminal, the access equipment directly binds the obtained address information of the user terminal with the port information corresponding to the access equipment, thereby achieving the auto binding in the absence of manual intervention.

DETAILED DESCRIPTION

Hereinafter, the present invention is illustrated in detail with reference to the embodiments and accompanying drawings.

The core concept of the present invention is as follows: during a process in which an access equipment requests a DHCP server to assign an IP address, the access equipment obtains the address information of the user terminal and the port information of the access equipment corresponding to the user terminal, and binds the address of the user terminal with the corresponding port of the access equipment according to the address information and the port information.

Figure 1:
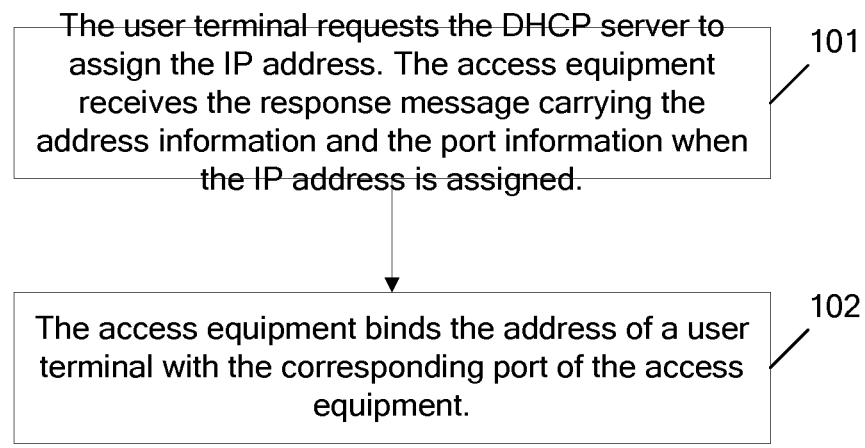
FIG. 1 is a flow chart of the present invention.

FIG. 1 is a flow chart of the present invention. As shown in FIG. 1, the method for binding an address of a user terminal in an access equipment according to the present invention includes the following steps.

In Step 101, the user terminal requests a DHCP server to assign an IP address, and the access equipment receives a response message from the DHCP server during a process in which the DHCP server assigns the IP address to the user terminal. The response message carries address information of a user terminal and port information of a corresponding port of the access equipment.

Here, the method which enables the user terminal to request the DHCP server to assign the IP address via the access equipment substantially includes the following: the user terminal transmits the DHCP protocol message to the access equipment, the access equipment performs an information process on the received DHCP protocol message, and then forwards the processed DHCP protocol message to the DHCP server. The processed DHCP protocol message carries an MAC address of the user terminal, and a Remote ID sub-option (RID) and/or a channel ID sub-option (CID), including the port information. The DHCP server inquires a configuration database stored therein according to the RID and/or the CID, determines the IP address assigned to the user terminal, and then returns the DHCP protocol response message to the user terminal via the access equipment. The DHCP protocol response message includes the MAC address of the user terminal, the RID and/or CID, and the IP address assigned to the user terminal. In this step, the address information of the user terminal is the MAC address and/or the IP address of the user terminal.

Usually, the access equipment receives the message transmitted by the user terminal by the manner of capturing message at the port. When the user terminal requests the DHCP server to assign an IP address, and if the access equipment captures the DHCP protocol message, the port information of the port in which the message is captured is initially recorded. The above-mentioned port information includes port position information and/or port description information. Hereinto, the port position information includes information such as frame, slot, port number, permanent virtual connection (PVC) and so on. The port description information is string information, such as a telephone number of the user or subscriber name. In practice, the port position information and the port description information are not strictly specified, and can be freely defined by the user as long as the port and the user terminal of the port can be identified. After that, the access equipment combines the captured port position information and the access equipment name into the CID, directly takes the port description information as the RID, then uses the CID and the RID to constitute the option field Option 82 of the DHCP protocol message, adds the option field Option 82 into the captured DHCP protocol message, and then forwards the DHCP protocol message carrying the option field Option 82 to the DHCP server.

In practice, the access equipment may also fill any one of the CID and the RID in the option field Option 82, i.e., add the CID or the RID into the captured DHCP protocol message. Moreover, the DHCP protocol message transmitted by the user terminal to the access equipment usually includes the MAC address of the user terminal itself. That is, the DHCP protocol message received by the DHCP server at least includes the MAC address of the user terminal, the RID, and/or the CID.

The DHCP server inquires the configuration database stored therein by using the RID and/or the CID as the index. The configuration database saves various configuration information of the user terminal, such as information of IP address, mask, lease, gateway, domain name server (DNS), and so on. After determining the configuration information of the user terminal from the configuration database, the DHCP server writes the configuration information, including the IP address assigned to the user terminal into the DHCP response message, and then feeds the RID and/or the CID and the MAC address of the user terminal back into the DHCP response message. Then, the DHCP server returns the DHCP response message to the user terminal via the access equipment.

In Step 102, the access equipment binds the address of the user terminal with the corresponding port on the access equipment according to the address information and the port information in the response message.

After receiving the response message from the DHCP server, the access equipment may obtain the MAC address of the user terminal, the RID and/or the CID and the configuration information, including the IP address from the DHCP response message. At this time, the access equipment may directly bind the port information and the address information in the RID and/or the CID. The address information is the MAC address and/or the IP address of the user terminal.

That is to say, since the port can be marked by the port position information in the RID, or the port description information in the CID, both the MAC address of the user terminal and the assigned IP address can mark the user terminal. Therefore, the binding of the address of the user terminal with the corresponding port on the access equipment can be achieved by binding the port position information in the RID and the MAC address of the user terminal, binding the port position information in the RID and the IP address of the user terminal, or binding the port position information in the RID, the MAC address, and the IP address of the user terminal at the same time. Accordingly, the binding may also be achieved by means of the port description information in the CID, or the port position information in the RID and the port description information in the CID at the same time.

In order to better illustrate the solution of the present invention, a preferred embodiment is illustrated in detail below.

In this embodiment, it is provided that a port 1 of the access equipment serves a user terminal A and a user terminal B, and a port 2 serves a user terminal C. In this embodiment, the user terminal A requests to assign an IP address initially, and then uses the IP address to get access to the network, i.e., transmits the IP message and then gets offline.

Figure 2:
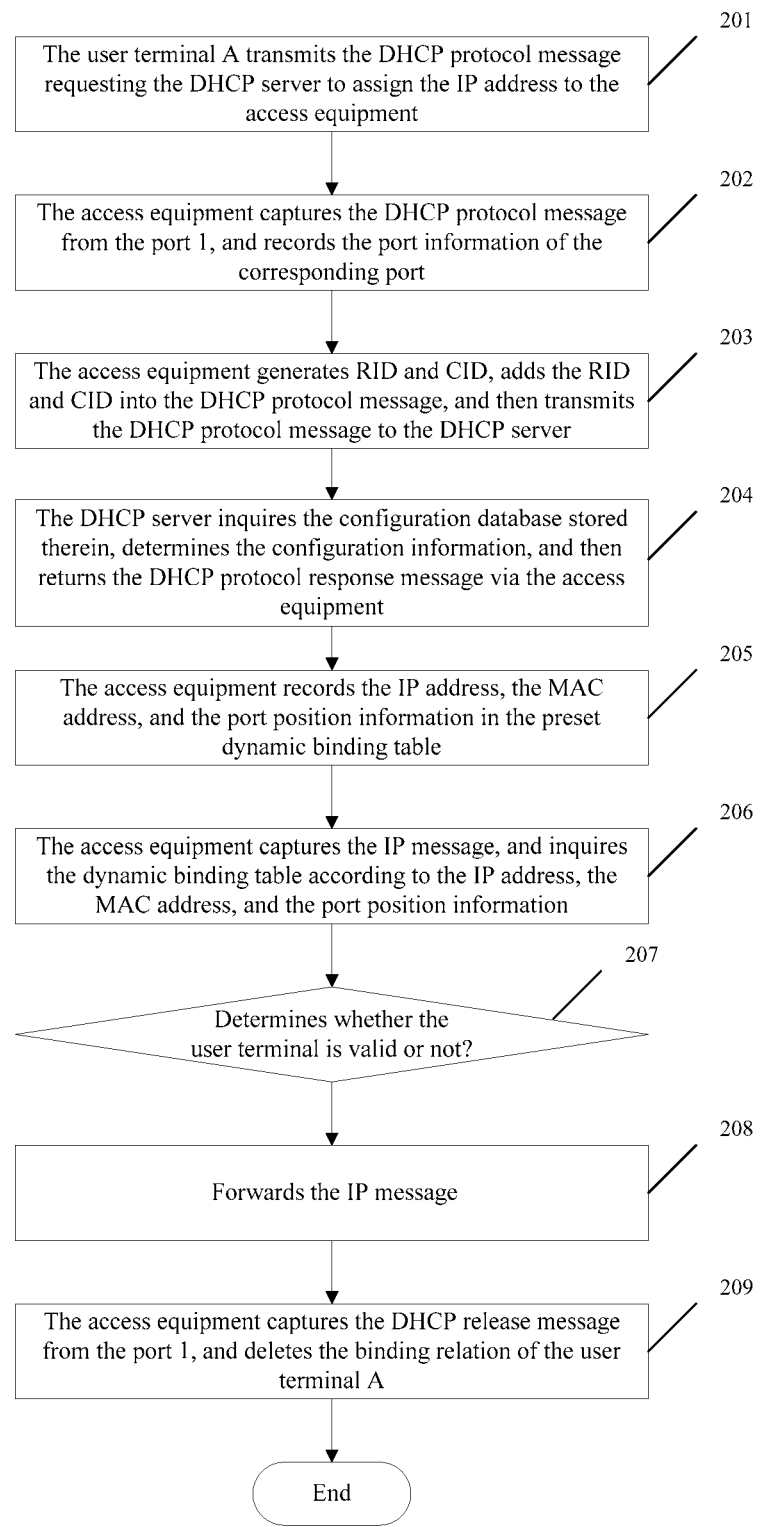
FIG. 2 is a flow chart of an application embodiment of the present invention.
Figure 3:
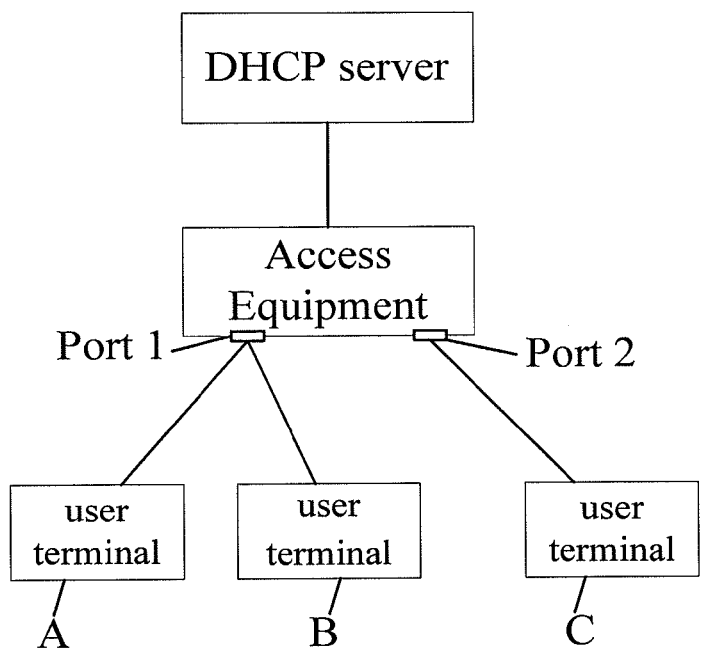
FIG. 3 is a structure of a system in an embodiment of the present invention.
Figure 4:
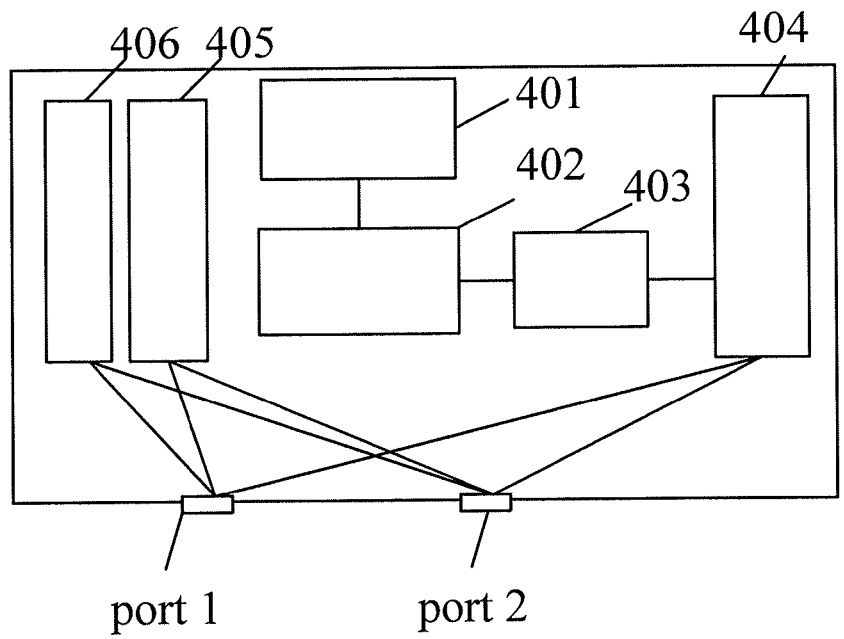
FIG. 4 is a structure of an access equipment in an embodiment of the present invention.

FIG. 2 is a flow chart of this embodiment. As shown in FIG. 2, this embodiment includes the following steps.

In Step 201, the user terminal A transmits the DHCP protocol message requesting the DHCP server to assign the IP address to the access equipment. The DHCP protocol message includes the MAC address of the user terminal A.

In Step 202, the access equipment captures the DHCP protocol message at the port 1 and records the port position information and the port description information of the port 1.

In Step 203, the access equipment combines the port position information of the port 1 and the access equipment name into the RID, takes the port description information as the CID, then constitutes the option field Option 82 by using the CID and the RID, adds the option field Option 82 into the DHCP protocol message, and then forwards the DHCP protocol message to the DHCP server.

In Step 204, the DHCP server inquires a configuration database stored therein according to the RID and the CID, determines the configuration information including the IP address for the user terminal, and then returns the DHCP protocol response message carrying the configuration information and the MAC address of the user terminal A to the user terminal A via the access equipment.

In this embodiment, Steps 201-204 are processes of the user terminal A requesting the DHCP server to assign the IP address. Actually, during the process of requesting to assign the IP address, the request message and the response message may be transmitted repetitively between the user terminal A and the DHCP server. That is, the user terminal A transmits a DHCP probe message to the DHCP server, and the DHCP server returns the DHCP probe response message. The user terminal A transmits the DHCP request message to the DHCP server, and the DHCP server returns the DHCP request response message. The details are described in DHCP protocol, and will not be repeated herein again.

In Step 205, after receiving the DHCP response message, the access equipment records the IP address assigned to the user terminal A, the MAC address of the user terminal A itself, and the port position information of the port 1 in a preset dynamic binding table.

The dynamic binding table may be in the form of Table 1 below.

TABLE 1

| Port position information | MAC address | IP address |
|---|---|---|
| ... | ... | ... |

In Steps 206-208, the access equipment captures the IP message carrying the IP address and the MAC address from the port 1; inquires the dynamic binding table according to the IP address, the MAC address, and the port position information; and determines whether the user terminal transmitting the IP message is valid or invalid. If the user terminal transmitting the IP message is valid, the access equipment forwards the IP message. Otherwise, the access equipment performs no process.

Here, whether the user terminal is valid or invalid is determined by actually determining whether the binding relationship among the IP address, the MAC address of the user terminal, and the port position information exists in the dynamic binding table or not. If it exists, the user terminal is determined to be valid.

In this embodiment, the port 1 of the access equipment serves two user terminals, i.e., the user terminal A and the user terminal B, and the port 2 serves one user terminal, i.e., the user terminal C. The access equipment captures the IP message from all the ports, but only the user terminal having a binding relationship recorded in the dynamic binding table can transmit the IP message via the access equipment, so as to gain access to the network.

If an invalid user assigns the IP address to the user terminal in a manner of static configuration, and uses the IP address to transmit the IP message to the access equipment. Since the access equipment cannot inquire and obtain the binding relationship among the IP address, the MAC address of the user terminal, and the port position information from the dynamic binding table, the access equipment cannot forward the captured IP message, and thus the invalid user cannot gain access to the network. For example, the user terminal C steals the IP address of the user terminal A in order to gain access to the network. Since the port position information corresponding to the user terminal C is different from the port position information corresponding to the user terminal A, the dynamic binding table does not include the binding relationship among the IP address of the user terminal A, the MAC address of the user terminal C, and the port position information of the port 2, the access equipment will refuse to forward the IP message for the user terminal C.

In Step 209, the user terminal A transmits a DHCP release message to the DHCP server via the access equipment. The access equipment captures the DHCP release message from the port 1; inquires the dynamic binding table according to the IP address, the MAC address, and the port position information carried in the message; and deletes the IP address, the MAC address, and the port position information from the dynamic binding table, i.e., deletes the binding relationship of the user terminal A.

At this time, the user terminal A is offline and the dynamic binding table does not exist the corresponding binding relationship. In this situation, if the invalid user steals the IP address of the user terminal A to gain access to the network, the access equipment cannot obtain the corresponding binding relationship by inquiring the dynamic binding table, and will refuse to forward the IP message for the invalid user.

Definitely, if the user terminal A gains access to the network again, Steps 201-204 are repeated to obtain the IP address. If the user terminal A is the leased line user, the fixed configuration information, such as the IP address, is saved in the configuration database of the DHCP server for the user terminal A in advance, and the user terminal A may obtain the same IP address again.

In the application of the solution in this embodiment, the valid user terminal may obtain the IP address from the DHCP server, and automatically create a dynamic binding relationship for the user terminal in the access equipment whenever the valid user terminal gains access to the network. When the user terminal is offline, the access equipment may automatically delete the corresponding binding relationship. Therefore, it could be avoided effectively if the IP address is stolen by the invalid user.

In practice, the user terminal may be offline due to a fault, and the access equipment cannot normally delete the corresponding binding relationship. In this situation, in order to prevent the invalid user from getting access to the network by using the IP address of the user terminal having the fault, an online detection timer is disposed in the access equipment for the valid user terminal. When the online detection timer reaches a timeout value, the access equipment transmits an address resolution protocol (ARP) request message to the user terminal, and determines whether the returned ARP response message is received. If the returned ARP response message is received, the access equipment refreshes the online detection timer. Otherwise, the access equipment deletes the corresponding binding relationship of the user terminal.

In addition, the user terminal may have a deadline for obtaining access to the network, i.e., the system sets a lease for the user terminal in advance. In order to manage the lease of the user terminal, a lease timer may be disposed in the access equipment for the user terminal. When the user terminal transmits a unicast lease renewal request message to the DHCP server via the access equipment, the access equipment determines whether the returned unicast lease renewal response message is received. If the returned unicast lease renewal response message is received, the access equipment refreshes the lease timer according to the unicast lease renewal response message. Otherwise, when the lease timer reaches the timeout value, the access equipment deletes the binding relationship and the lease timer corresponding to the user terminal.

Here, as specified in the DHCP protocol, when reaching ½ and ⅞ of the lease, the user terminal continually transmits the unicast lease renewal request message to the DHCP server via the access equipment. If the user repays the lease fee, the access equipment receives the unicast lease renewal response message from the DHCP server, and resets the timeout value of the lease timer according to the new lease. Thus, the user terminal may continue to gain access to the network.

If the user fails to pay the lease fee in time, the DHCP server will not transmit the unicast lease renewal response message to the access equipment. When the lease timer reaches the timeout value, the DHCP server may automatically delete the binding relationship and the lease timer corresponding to the user terminal. At the same time, the lease timer recording the deadline for the user terminal to obtain access to the network may also be deleted from the DHCP server. Thereafter, if the user terminal wants to gain access to the network, the user must pay the lease fee first, and the lease timer is reset by the DHCP server and the access equipment, and the DHCP reassigns an IP address to the user terminal. Otherwise, the DHCP will not assign the IP address to the user terminal.

It will be apparent to those skilled in the art that various modifications and variations can be made to the structure of the present invention without departing from the scope or spirit of the invention. The foregoing preferred embodiments do not intend to limit the scope of the present invention, and the present invention covers modifications and variations of this invention provided they fall within the scope of the following claims and their equivalents.

What is claimed is:

1. A method for binding an address of a user terminal in an access equipment, comprising:
  receiving, by the access equipment, a Dynamic host configuration protocol (DHCP) protocol response message from a DHCP server during a process in which the DHCP server assigns an internet protocol (IP) address to a user terminal, wherein the DHCP protocol response message comprises a media access control (MAC) address of the user terminal and the IP address assigned to the user terminal;
  binding, by the access equipment, the MAC address of the user terminal and the IP address assigned to the user terminal with the port information of the port on the access equipment, wherein the port information indicates a port that receives a DHCP request message from the user;
  inquiring, the by access equipment, the dynamic, binding table according to a MAC address of a given user terminal and an IP address of the given user terminal in an IP message and port information of a given port where the IP message is captured;
  forwarding the captured IP message if the MAC address of the user terminal and the IP address of the given user terminal corresponding to the port information of the given port exist; and
  not forwarding the IP message otherwise;
  wherein binding the MAC address of the user terminal and the IP address assigned to the user terminal with the port information of the port on the access equipment comprises:
    recording, by the access equipment, a binding relationship among the MAC address of the user terminal, the IP address assigned to the user terminal, and the port information in a dynamic binding table.

2. The method according to claim 1, wherein the process that the DHCP server assigns the IP address to the user terminal comprises:
  transmitting, by the user terminal, a DHCP protocol message to the access equipment; performing, by the access equipment, an information process on the received DHCP protocol message and then forwarding the processed DHCP protocol message to the DHCP server, wherein the processed DHCP protocol message carries the MAC address of the user terminal; and a Remote ID sub-option (RID) and/or a channel ID sub-option (CID) comprising the port information;
  inquiring, by the DHCP server, a configuration database stored in the DHCP server according to the RID and/or the CID, determining the IP address assigned to the user terminal; and then returning the DHCP protocol response message to the user terminal via the access equipment, wherein the DHCP protocol response message carries the MAC address of the user terminal, the RID and/or the CID, and the IP address assigned to the user terminal.

3. The method according to claim 2, wherein the manner of performing, by the access equipment, the information process on the received DHCP protocol message comprises:
  recording, by the access equipment, the port information of the port in which the DHCP protocol message is captured, generating a RID and/or a CID according to the port information, and then adding the RID and/or the CID into the received DHCP protocol message.

4. The method according to claim 1, wherein the port information includes port position information, the port position information including frame, slot, port number and permanent virtual connection (PVC).

5. The method according to claim 4, wherein the port information further includes port description information, and the port description information includes a telephone number of the user or subscriber name.

6. The method according to claim 1, subsequent to Step B, further comprising:
    deleting, by the access equipment, the binding relationship corresponding to the user terminal from the dynamic binding table when the access equipment captures a DHCP release message carrying the MAC address of the user terminal and the IP address of the user terminal.

7. The method according to claim 1, subsequent to Step B, further comprising:
    setting an online detection timer for the user terminal; when the online detection timer reaches a timeout value, transmitting, by the access equipment, an address resolution protocol (ARP) request message to the user terminal, and determining whether a returned ARP response message is received; and if the returned ARP response message is received, refreshing the online detection timer; otherwise, deleting the binding relationship corresponding to the user terminal from the dynamic binding table.

8. The method according to claim 1, wherein a lease timer is set for the user terminal in the access equipment, and subsequent to Step B, the method further comprises:
    when the user terminal transmits a unicast lease renewal request message to the DHCP server, determining, by the access equipment, whether a returned unicast lease renewal response message is received; and if the returned unicast lease renewal response message is received, refreshing the lease timer according to the unicast lease renewal response message; otherwise, when the lease timer reaches the timeout value, deleting the binding relationship corresponding to the user terminal and the lease timer.

9. An access equipment which comprises a plurality of ports serving a plurality of user terminals and configured to communicate with the plurality of user terminals and a Dynamic host configuration protocol (DHCP) server so as to request the DHCP server to assign Internet Protocol (IP) addresses, comprising:
    a module (401) configured to receive a DHCP response message from the DHCP server during a process that the DHCP server assigns an IP address to a user terminal, wherein the DHCP protocol response message comprises a media access control (MAC) address of the user terminal, the IP address, port information of a port on the access equipment to which a DHCP protocol message is sent from the user terminal;
    a module (402) configured to bind the MAC address of the user terminal and the IP address of the user terminal with the port information carried in the DHCP response message;
    a module (403) configured to record a binding relationship among the MAC address of the user terminal, the IP address of the user terminal and the port information in a dynamic binding table; and
    a module (404) configured to inquire the dynamic binding table according to a MAC address and an IP address of a given user terminal in an Internet Protocol (IP) message and port information of a given port where the IP message is captured; and if the MAC address and the IP address of the given user terminal corresponding to the port information of the given port exists, forward the captured IP message, otherwise not forward the captured IP message.

10. The access equipment according to claim 9, further comprising:
    a module (405) adapted to delete the binding relationship corresponding to the user terminal from the dynamic binding table when capturing a DHCP release message carrying the MAC address and the IP address of the user terminal from the port.

11. The access equipment according to claim 9, further comprising:
    a module (406) adapted to perform an information process on a received DHCP protocol message from the user terminal at a port of the access equipment and forward the processed DHCP protocol message to the DHCP server, wherein the processed DHCP protocol message carries the MAC address of the user terminal and the port information of the port of the access equipment corresponding to the user terminal.

12. A system comprising an access equipment and a dynamic host configuration protocol (DHCP) server comprising a processor and a memory, the system comprising:
    the DHCP server configured to receive a DHCP protocol message, wherein the DHCP protocol message carries a media access control (MAC) address of a user terminal and port information of a port of the access equipment corresponding to the user terminal; determine an internet protocol (IP) address assigned to the user terminal according to said port information; and transmit an DHCP protocol response message to the access equipment, wherein the DHCP protocol response message carries the MAC address of the user terminal, the IP address assigned to the user terminal and the port information of the port of the access equipment;
    the access equipment configured to receive the DHCP protocol response message from the DHCP server during a process in which the DHCP server assigns an IP address to the user terminal; and bind the MAC address of the user terminal and the IP address assigned to the user terminal with the port on the access equipment according to the address information and the port information carried in the DHCP protocol response message;
    wherein the access equipment is further configured to set a dynamic binding table, and record, in the dynamic binding table, a binding relationship among the MAC address of the user terminal, the IP address of the user terminal and the port information of the user terminal, and
    wherein the access equipment is further configured to:
        capture an IP message from a given port and inquire the dynamic binding table according to a given IP address and a given MAC address which are carried in the IP message and the port information of the given port where the IP message is captured;
        forward the captured IP message if a binding relationship between the given IP address and the given MAC address corresponding to the port information of the given port exists in the dynamic binding table; and
        not forward the captured IP message otherwise.

13. A digital subscriber line access multiplexer (DSLAM) comprising a plurality of ports and configured to communicate with a plurality of user terminals and a dynamic host configuration protocol (DHCP) server, comprising a processor configured to:

receive a DHCP protocol response message from the DHCP server during a process in which the DHCP server assigns an internet protocol (IP) address to a user terminal, wherein the DHCP protocol response message comprises a media access control (MAC) address of the user terminal, the IP address assigned to the user terminal and port information of a port on the DSLAM to which a DHCP protocol message is sent from the user terminal; and bind the MAC address of the user terminal and the IP address of the user terminal with the port information carried in the DHCP protocol response message;

record a binding relationship among the MAC address of the user terminal, the IP address of the user terminal and the port information in a dynamic binding table;

capture an IP message carrying a MAC address of a given user terminal and an IP address of the given user terminal from a given port of the DSLAM; and inquire the dynamic binding table according to the MAC address and IP address of the given user terminal in the IP message and port information of the given port; and if the address information of the given user terminal corresponding to the port information of the given port exists, forwarding the captured IP message; otherwise, not forwarding the captured IP message.

14. The DSLAM according to claim 13, wherein the processor is configured to receive a DHCP protocol message from the user terminal at a port;

perform an information process on the received DHCP protocol message and then forwarding the processed DHCP protocol message to the DHCP server to request the DHCP server to assign the IP address, wherein the processed DHCP protocol message carries the MAC address of the user terminal; and the port information of the port.

15. The DSLAM according to claim 13, wherein the processor is configured to:

delete the binding relationship corresponding to the user terminal from the dynamic binding table when capturing a DHCP release message carrying the MAC address and IP address of the user terminal.

* * * * *

UNITED STATES PATENT AND TRADEMARK OFFICE
CERTIFICATE OF CORRECTION

PATENT NO. : 8,812,691 B2  
APPLICATION NO. : 12/192972  
DATED : August 19, 2014  
INVENTOR(S) : Shi Page 1 of 1

It is certified that error appears in the above-identified patent and that said Letters Patent is hereby corrected as shown below:

On the Title page, References Cited, Foreign Patent Documents, the filing date for CN 1416239 "7/2003" should read -- 5/2003 --.

In the Claims

Column 8, line 23, "the by" should read -- by the --.

Signed and Sealed this
Sixth Day of January, 2015

Michelle K. Lee
*Deputy Director of the United States Patent and Trademark Office*